Feb. 4, 1958 R. J. LUNN ET AL 2,822,059
AIR CLEANER
Filed May 5, 1954
Fig. 1
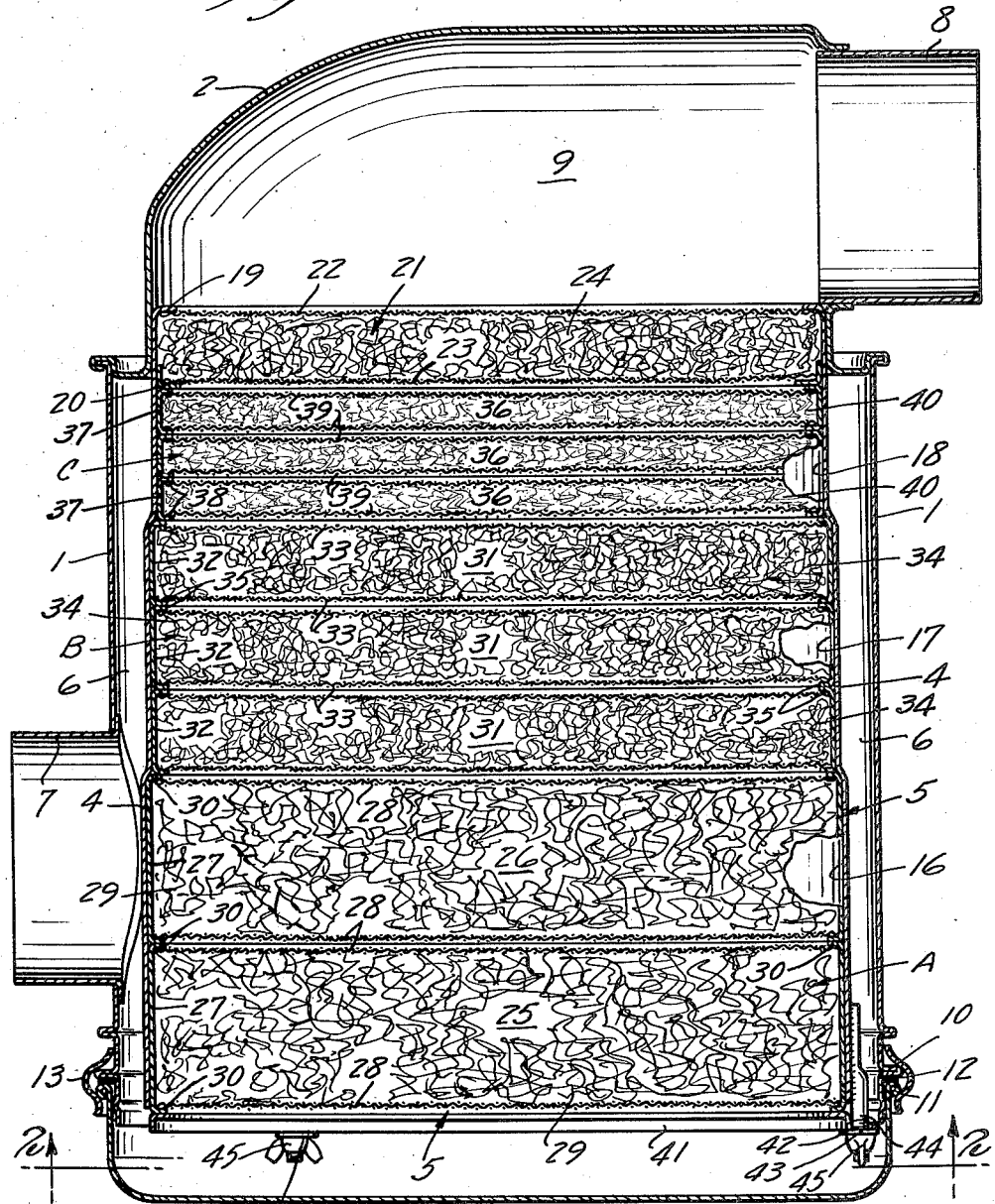
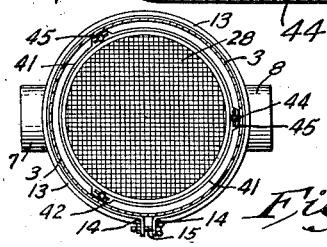
Fig. 2
INVENTORS
ROBERT J. LUNN
FRANK A. DONALDSON, JR.
BY
Merchant & Merchant
ATTORNEYS

2,822,059

AIR CLEANER

Robert J. Lunn and Frank A. Donaldson, Jr., St. Paul, Minn., assignors to Donaldson Company, Inc., St. Paul, Minn., a corporation of Delaware Application May 5, 1954, Serial No. 427,838

1 Claim. (Cl. 183—70)

Our invention relates generally to air cleaners and more specifically to so-called "dry" type air cleaners utilized in connection with internal combustion engines, air compressors and the like.

More particularly, our present invention is in the nature of an air cleaner having a filter structure involving a plurality of intercommunicating filter sections, each having different filtering characteristics than another thereof, and mounted in a casing structure in a predetermined serial order.

The primary object of our invention is the provision of an air cleaner of the above type in which the several cooperating filter sections of the filter structure may be mounted in the casing of the cleaner in a given serial order only.

Another important object of our invention is the provision of novel means for releasably mounting the filter structure in a chamber defined by the casing structure of the cleaner, in a manner permitting ready removal of the several filter sections for cleaning and servicing thereof separately, and for easy reassembly of the air cleaner.

A still further object of our invention is the provision of casing structure for air cleaners of the type set forth, which defines a filter chamber, and which is provided surfaces each telescopically interfitting a cooperating surface of a different one of the filter sections of our invention.

Another object of our invention is the provision of an air cleaner as set forth which removes dust from an air stream with a high degree of efficiency and without an appreciable loss of air pressure.

Another object of our invention is the provision of an air cleaner as set forth which is relatively simple and inexpensive to produce, and which is rugged in construction and durable in use.

The above and still further highly important objects and advantages of our invention will become apparent from the following detailed specification, appended claim and attached drawings.

Referring to the drawings, which illustrate the invention, and in which like characters indicate like parts throughout the several views:

Fig. 1 is a view in axial section of an air cleaner made in accordance with our invention; and Fig. 2 is a transverse section taken substantially on the line 2—2 of Fig. 1 on a reduced scale.

In the invention as illustrated in Figs. 1 and 2, a generally cylindrical casing structure is shown as involving a generally cylindrical casing section 1, a top section or head 2, a removable cup-like bottom section 3 and a generally cylindrical sleeve section 4 which defines a chamber 5. The cylindrical casing section 1 and sleeve section 4 cooperate to define an annular inlet passage 6 which communicates with the lower end of the chamber 5. The casing section 1 is provided with an air inlet 7 which communicates with the lower end of the chamber 5 through the annular passage 6, and the head 2 is provided with an air outlet 8 which communicates with the upper end of the chamber 5 through an outlet chamber 9 defined by the head 2.

The lower end of the cylindrical wall section 1 is telescopically received within the cup-like bottom section 3, and is provided with an annular flange 10 between which and the beaded marginal edge 11 of the bottom section 3 is interposed a sealing ring or the like 12. A clamping ring 13 engages the flange 10 and beaded marginal edge 11, and is formed to provide outwardly projecting ears 14 through which extends a nut-equipped clamping screw 15 for rigidly securing the bottom section 3 in operative engagement with the lower end of the cylindrical casing section 1.

The sleeve section 4 is formed to provide a plurality of inner chamber wall surfaces 16, 17 and 18 which are respectively of progressively smaller diameter from the lower intake end of the chamber 5 to the upper outlet end thereof. In other words, the wall surface 17 is of smaller diameter than that of the cylindrical wall surface 16 whereas the cylindrical wall surface 18 is of smaller diameter than that of the cylindrical wall surface 17. The upper end of the sleeve section 4 is formed to provide an inturned annular flange 19, and a retaining flange element 20 is welded or otherwise secured to the wall surface 18 in downwardly spaced relation to the flange 19. The flanges 19 and 20 cooperate to support and retain a permanent filter 21 comprising a pair of spaced screens 22 and 23, between which is interposed a filter medium 24, preferably made from lightly packed fibers or filaments of suitable materials such as metal, glass or synthetic resin. The screens 22 and 23 are preferably made from woven wire cloth.

Removably mounted in the chamber 5 is a filter structure comprising a plurality of filter sections A, B and C. The filter section A comprises a pair of identical filter units or elements 25 and 26 each including an annular imperforate peripheral wall 27, axially spaced screens 28 and a filter medium 29. At their opposite ends, the peripheral walls 27 are formed to provide inturned flanges 30 for retaining the screens 28 and the filter medium therebetween. The diameter of the peripheral walls 27 is such that the filter elements 25 and 26 have relatively snug fitting telescopic engagement with the inner wall surface 16 of the sleeve 4. As above mentioned, the diameter of the wall surface 16, being greater than that of the wall surface 17 or 18, the filter elements 25 and 26 which comprise the filter section A telescopically interfit only the portion of the chamber defined by the wall surface 16, and cannot be placed elsewhere within the chamber 5. Also preferably and as shown, the axial height of the filter elements or units 25 and 26 are together equal to the axial length of the wall surface 16. The filter screens 28 are preferably made from loosely woven wire cloth similar to the screens 22 and 23, and the filter medium 29 is preferably made from fibers or filaments of suitable material such as metal, glass or synthetic resin. The fibers or filaments comprising the filter media 29 are preferably of a given preselected diameter or thickness and packed between their respective retaining screens 28 to a preselected given density, whereby to obtain a desired filtering characteristic for the filter section A.

The filter section B comprises a plurality, as shown 3, of like units or elements 31, each of which comprises an annular imperforate peripheral wall 32, retaining screens 33 and a filter medium 34. The walls 32 are inturned at their opposite ends to provide annular flanges 35 for retaining the screens 33. The walls 32 of the several identical filter elements 31 are of a diameter to snugly telescopically interfit with the cylindrical wall surface 17 of the sleeve 4 in the same manner as the filter elements 25 and 26 fit their respective wall surface 16. Also, preferably, and as shown in Fig. 1, the total axial length of the several filter units or elements 31 is substantially equal to the axial length of the inner wall surface 17 of the sleeve 4. The filter media 34 within the elements 31 is preferably made of fibers or filaments of material similar to the filter media 29, the filter medium in each of the filter elements 31 being packed between their respective retaining screens 33 to a different degree of density than that of the filter elements 25 and 26. Also preferably, the filaments comprising the filter media 31 differs from the diameter or thickness of the filaments comprising the filter media 29. The difference in filament size and the difference in density at which the filaments are packed in their respective sections A and B provides for a difference in filtering characteristics between the filter elements of section A and those of the filter section B. The diameter of the filter elements 31, being greater than that of the inner wall surface 18 of the sleeve 4, the filter elements 31 of the section B will fit only the inner wall surface portion 17 of the sleeve 4.

The filter section C comprises a plurality, as shown 3, of filter units or elements 36 which are similar to the filter elements of the sections A and B, and which elements each have imperforate cylindrical walls 37 formed at their opposite ends to provide axially spaced inturned annular flanges 38 which serve as retainers for woven wire screens 39. Filter media, indicated at 40, is disposed between opposite screens 39 of each unit or element 36, said filter media 40 being similar to that utilized in connection with the filter sections A and B. The fibers or filaments of the filter medium 40 in each of the elements 36 is made from filaments or fibers having a different diameter or thickness from those of the filter media 29 or 34, and are packed between their respective screens 39 to an extent whereby the filtering characteristics of the filter elements 36 differ from the filtering characteristics of the filter sections A and B. The diameters of the peripheral walls 37 of the elements 36 are such that the elements 36 will snugly telescopically interfit the inner wall surface 18 of the sleeve 4.

Preferably, the filtering characteristics of the several sections A, B and C is such that, when the cleaner of Figs. 1 and 2 is utilized to remove dust particles or other foreign matter from an air stream, the largest size dust particles are first removed by the filter elements 25 and 26 of the filter section A, as the air enters the chamber 5 from the open bottom thereof. As the air stream progresses upwardly through the chamber 5, smaller sized particles of dust or foreign matter are intercepted by the elements of the filter section B, whereas the smallest size particles are intercepted and held by the filter elements of the filter section C. Thus, each of the filter sections plays a given part in removing all of the dust from the air stream before said stream is discharged outwardly through the outlet 8. The permanent filter 21 not only intercepts any particles of filament or fiber which may break loose from the filter media in the removable sections A, B and C whereby to prevent said fibers from being entrained in the air stream, but also protects the intake end of the associated device from entry of foreign matter during servicing of the removed filter sections.

The air cleaner above described is preferably utilized in an air stream in connection with a precleaner, not shown, which removes the greatest portion of dust and foreign matter from the air stream before the air enters the inlet tube 7 of the air cleaner of Figs. 1 and 2. Thus, the percentage of dust removed by our air cleaner above described is relatively small. However, it is important that even this dust or foreign matter be eliminated from the air stream before the same comes in contact with moving parts of an internal combustion engine, air compressor or the like, and with the proper sized filaments or fibers packed to an efficient degree within the several filter elements and arranged properly as to their various filtering characteristics, substantially dust free air is delivered from the chamber 9 outwardly through the air outlet 8. For the above described air cleaner to operate at its greatest efficiency, it is important that the diferent filter sections A, B and C be replaced in their proper order after the same have been removed from the chamber 5 for cleaning or servicing. For this reason the filter elements of the various filter sections are of a size with respect to the chamber 5, that they may be replaced in but one serial order. Thus, when the filter elements have been removed and cleaned, or otherwise serviced, and the operator neglects to replace the filter element 36 of section C, he will be instantly aware after he has replaced the elements of sections A and B that no room is left in the chamber 5 for the filter elements of section C. Thus, with the above arrangement, it is not possible to replace the several sections except in their proper order for most efficient operation.

For the purpose of releasably locking the filter structure in the chamber 5, we provide a clamping ring 41 which is engageable with the inturned flange 30 of the bottom filter element 25, and which is provided with a plurality of circumferentially spaced outturned ears 42, each of which has an aperture 43 therein. The apertures 43 are adapted to receive the lower threaded end portions of circumferentially spaced studs 44 which are welded or otherwise secured to the lower end portion of the sleeve 4 and which extend downwardly therefrom. Wing nuts 45 are screw threaded on the lower ends of the studs 44 below the ears 42 of the clamping ring 41. Tightening of the wing nuts 45 draws the clamping ring 41 into engagement with the filter element 25 whereby to rigidly clamp said filter element 25 and all of the other superimposed filter elements of the filter structure within the chamber 5.

Our invention has been thoroughly tested and found to be completely satisfactory for the accomplishment of the objectives set forth; and while we have shown and described a preferred embodiment of our improved air cleaner construction, it will be understood that the same is capable of modification without departure from the spirit and scope of the invention as defined in the claim.

What we claim is:

In an air cleaner, casing structure comprising cooperating casing sections defining an air inlet and an air outlet, a tubular supporting sleeve within said casing structure defining a chamber communicating with said inlet and outlet, said sleeve having a plurality of cylindrical surfaces of progressively greater diameter from one end of the chamber toward the other end thereof, a filter structure removably mounted in said chamber between the inlet and outlet, said filter structure comprising a plurality of filter sections in intercommunicating serial arrangement, each of said filter sections having a filter medium having different filtering characteristics than another thereof, each of said filter sections including a plurality of like units each comprising a pair of spaced perforate end walls and an imperforate cylindrical wall, said walls defining a container for the filter medium, the outer surfaces of the cylindrical unit walls of each of said sections being adapted to telescopically interfit a different cooperating one only of the cylindrical inner surfaces of said supporting sleeve, whereby said sections may be removed from said sleeve and replaced in only a single predetermined serial order, and means for releasably locking said filter structure in said chamber.

References Cited in the file of this patent

UNITED STATES PATENTS 1,395,833    Kling et al. _____ Nov. 1, 1921
1,860,778    Howard _____ May 31, 1932

(Other references on following page)

UNITED STATES PATENTS

| | | |
|---|---|---|
| 1,963,874 | Stampe | June 19, 1934 |
| 2,050,581 | Orem | Aug. 11, 1936 |
| 2,083,649 | Heglar | June 15, 1937 |
| 2,138,874 | Myers | Dec. 6, 1938 |
| 2,195,565 | Fricke | Apr. 2, 1940 |
| 2,220,127 | Slayter | Nov. 5, 1940 |
| 2,367,227 | Lowther | Jan. 16, 1945 |
| 2,406,188 | Beatty et al. | Aug. 20, 1946 |

FOREIGN PATENTS

| | | |
|---|---|---|
| 210,939 | Germany | June 16, 1909 |